(No Model.) 2 Sheets—Sheet 1.

D. B. ENGLISH
PLOW

No. 490,276. Patented Jan. 24, 1893.

Witnesses
Chas. H. Ourand
N. J. Riley

Inventor
David B. English
By his Attorneys,
C. A. Snow & Co.

(No Model.) 2 Sheets—Sheet 2.

D. B. ENGLISH.
PLOW.

No. 490,276. Patented Jan. 24, 1893.

Witnesses
Cha³ H. Ourand
N. J. Riley

Inventor
David B. English
By his Attorneys,
C. A. Snow & Co.

UNITED STATES PATENT OFFICE.

DAVID BARTON ENGLISH, OF GUERNEVILLE, CALIFORNIA.

PLOW.

SPECIFICATION forming part of Letters Patent No. 490,276, dated January 24, 1893.

Application filed July 27, 1892. Serial No. 441,388. (No model.)

*To all whom it may concern:*

Be it known that I, DAVID BARTON ENGLISH, a citizen of the United States, residing at Guerneville, in the county of Sonoma and State of California, have invented a new and useful Hillside-Plow, of which the following is a specification.

The invention relates to improvements in hillside plows.

The object to the present invention is to improve the construction of hillside plows, and to enable them to be readily adjusted without the operator leaving his station for plowing up or down hill.

A further object of the invention is to provide means for preventing a plow slipping while turning soil up hill.

The invention consists in the construction and novel combination and arrangement of parts hereinafter fully described, illustrated in the accompanying drawings and pointed out in the claims hereto appended.

Figure 1:
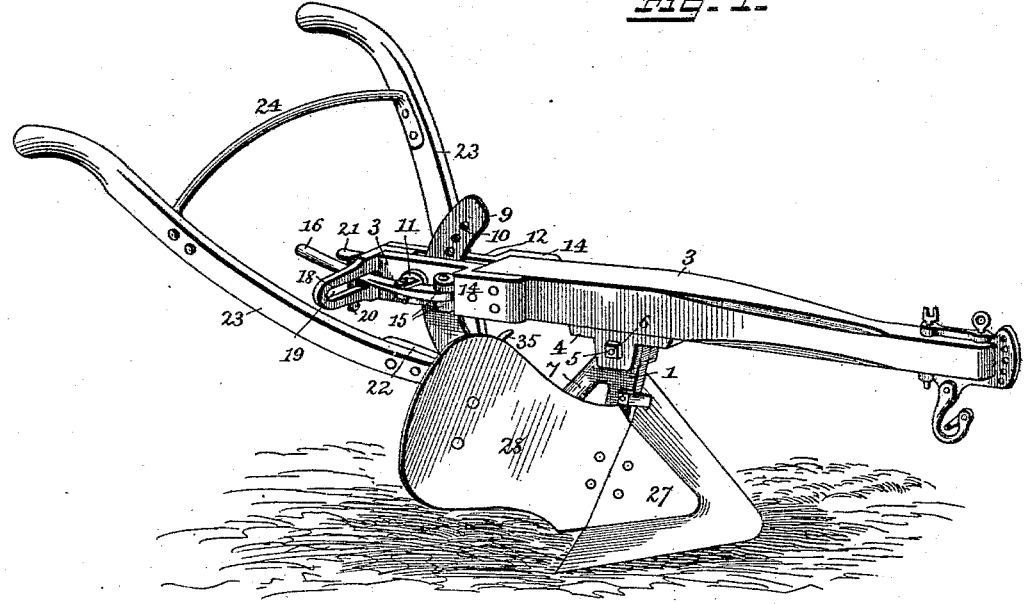
Figure 5:
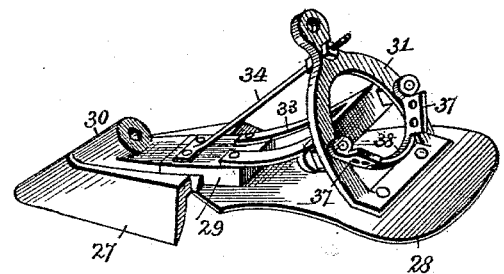
Figure 2:
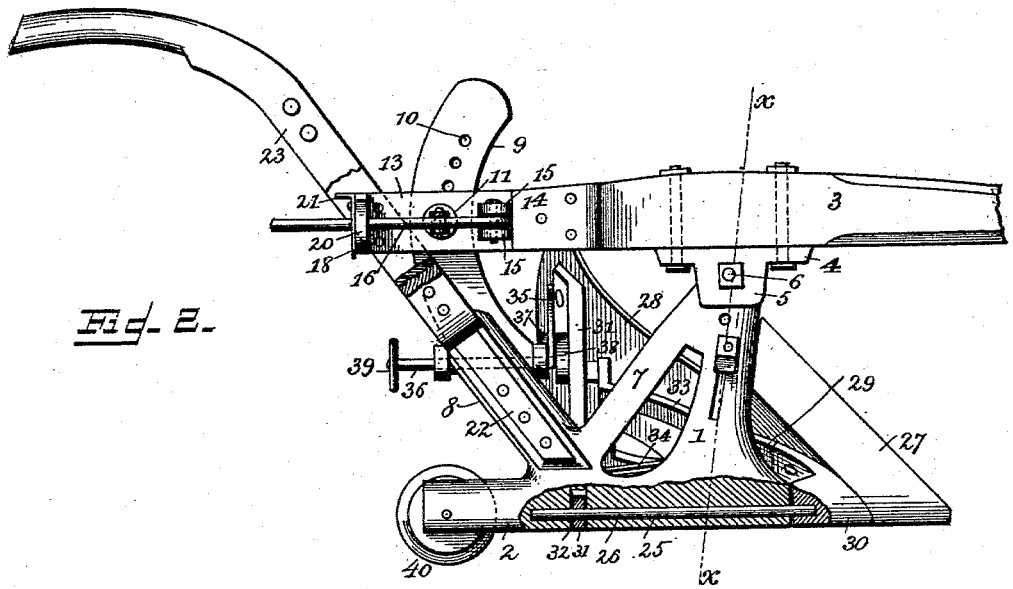
Figure 3:
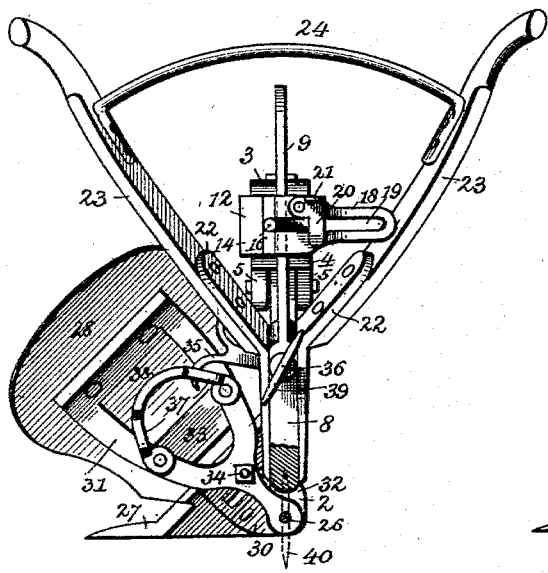
Figure 4:
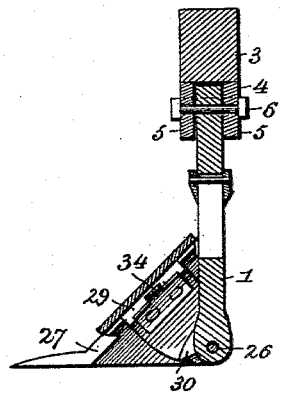

In the drawings—Figure 1 is a perspective view of a hillside plow constructed in accordance with this invention. Fig. 2 is a side elevation partly in section. Fig. 3 is a rear elevation partly in section. Fig. 4 is a detail sectional view on line $x$, $x$ of Fig. 2. Fig. 5 is a detail perspective view of the plow share and mold-board detached, showing the braces of the same.

Like numerals of reference indicate corresponding parts in all the figures of the drawings.

1 designates a plow-standard having formed integral with it a rearwardly extending landside 2, and having its upper end forming a fulcrum for a plow beam 3 having secured to its lower face a plate 4 which is provided with depending ears 5 between which is pivoted by a bolt 6, the upper end of the standard. The standard is provided with a brace 7, which inclines downward from its upper end, and which is formed integral with it, and it is provided with a upwardly and rearwardly inclined arm 8 and secured to the latter is an upwardly extending curved bar 9 which is provided with a series of perforations 10, and which is adapted to be engaged by a horizontal pin 11 of the plow beam to secure the rear end of the latter at the desired elevation to regulate the depth of the plow. The plow beam has secured to its rear end, rearwardly extending parallel plates 12 and 13 which are provided at their front ends with angular bends 14 to increase the space between them to receive the plow beam to which they are bolted. The curved bar 9 is arranged in a space between the extended portions of the plates 12 and 13; the plate 13 is provided at its bend with ears 15 between which is pivoted one end of a lever 16, and the horizontal pin 11 is pivoted to the lever 16, and is arranged in opening 17 of the plates 12 and 13, and is adapted to enter any one of the perforations of the curved bar, whereby the rear end of the beam is secured at the desired elevation.

The rear ends of the plates 12 and 13 are spaced by an L-shaped plate 18, which has one arm arranged between the plates, and its other arm extending laterally from them and provided with a longitudinal slot 19 to receive the lever 16, and the latter is retained at the inner end of the slot to secure the pin in the openings of the plate and the curved bar by a pivoted L-shaped catch 20, which is provided with a lip 21 which forms a handle.

The lower end of the curved bar is bolted to the arm of the standard, and handle plates or irons 22 are secured to opposite sides of the arm 8, and have attached to them the lower ends of handles 23 which are connected near their outer ends by a curved cross-bar 24. This standard is provided with a longitudinal socket 25 extending along the landside portion and receiving a rod 26 which projects beyond the front end of the foot of the standard, and which serves as a pivot on which a plowshare 27 and a mold-board 28 turn to swing from one side of the plow to the other.

The mold-board and the plow-share are connected and secured together by a plate 29, which is arranged on the inner faces of those parts, and is provided on its upper face with an offset which allows for the difference in thickness between the plowshare and the mold-board, and its lower face is flat and unbroken which admits of its use in connection with a plowshare and mold-board of the same thickness. The plowshare has secured to its lower face a socket plate 30 to receive the extended end of the pivot rod 26; and the mold-board has secured to it the upper end of an approximately Y-shaped brace 31 which has its lower end perforated and arranged in the slot 32 of the landside, and hinged by the pivot rod. The Y-shaped brace is connected with the securing plate 29 by a truncated triangular brace 33, and a T-shaped brace 34. The socket plate by being formed separate from the securing plate, may be replaced when worn by a new plate at much less cost and with less trouble than could be were it formed integral with the securing plate.

The plowshare and mold-board are secured at either side of the plow by a double hook 35 which consists of two oppositely disposed hooks and a shank, and which is mounted on and carried by a shaft 36, and which is adapted to be turned by the shaft to either side of the plow to engage perforated flanges 37 of a transversely disposed curved bar 38 which is arched and connects the sides of the diverging or forked portion of the Y-shaped brace. The ends of the curved bar 38 are formed into ears and are secured to the Y-shaped brace by the bolts which fasten the triangular brace to the same, and the perforations of the flanges permit an adjustment of the plowshare and mold-board. The double hook 35 is arranged at the inner end of the shaft 36, and the outer end of the shaft is provided with a handle 39. It will thus be seen that the lever 16 and the handle 35 are arranged close to the plow-handles, so that the adjustment and arrangement of the plow may be performed without necessitating the operator leaving his position at the plow-handles.

The rear end of the landside is provided with a vertical slot and pivotally mounted therein is a disk colter 40, which depends from the landside, and when turning the soil up hill takes into the soil or ground at the bottom of the furrow, and prevents the plow sliding off as without such a provision, the weight of the soil would force the plow downward.

What I claim is—

1. In a plow, the combination of a standard, a plow beam fulcrumed thereon, a curved bar extending upward from the rear of the standard and provided with a series of perforations, rearwardly extending plates secured to the beam at the rear end thereof and having a space between them to receive the curved bar and provided with a perforation, and a pin arranged in the perforation of the plates and adapted to engage any one of the perforations of the curved bar, substantially as described.

2. In a plow, the combination of a standard, a plow beam fulcrumed thereon, plates extending rearwardly from the plow beam and disposed longitudinally of the beam and having a space between them and provided with a perforation, a laterally extending plate having a longitudinal slot, a pin arranged in the perforation of the longitudinally disposed plate and engaging one of the perforations of the curved bar, a lever fulcrumed at its inner end to one of the longitudinally disposed plates and arranged in the slot of the laterally extending plate and having the pin connected to it, and a pivoted catch mounted on the laterally extending plate and adapted to secure the lever against outward movement, substantially as described.

3. In a plow, the combination of a standard, a beam fulcrumed on the same, the longitudinally disposed plates projecting rearward from the beam and provided with outward bends to receive the latter, a laterally extending plate having an arm arranged between the rear ends of the longitudinally disposed plates and spacing the same, perforated ears arranged on one of the longitudinal plates, a curved bar rising from the standard and provided with a series of perforations and arranged in a space between the longitudinal bars, a pin passing through the longitudinal plates and engaging the curved bars, a lever having its inner end pivoted between said ears and its outer end arranged in the slots of the laterally extending plate and an L-shaped catch pivoted to the latter and arranged to engage the lever, substantially as described.

4. In a plow, the combination of a standard, a plow beam secured to the same a plowshare and mold-board connected together and hinged to the foot of the standard and adapted to swing to either side of the same, a curved transversely disposed bar connected with the mold-board and provided at its ends with similar flanges, each of which is provided with a series of perforations to permit an adjustment of the mold-board a shaft journaled on the standard and a double hook carried by the shaft and adapted to engage the perforations of the flanges, substantially as described.

5. In a hillside plow, the combination of a standard having a landside and provided with an opening extending longitudinally of the latter, and having a transverse slot, a pintle rod arranged in the longitudinal opening and projecting from the front end of the landside, a plow share, a mold-board, a securing plate having an offset and connecting the plowshare and the mold-board, a socket plate secured to the plowshare and receiving the projecting end of the pintle rod, an approximately Y-shaped brace secured to the mold-board and hinged on the slot of the land-side by the pintle rod, braces connecting the securing plate with the Y-shaped brace, a transversely disposed curved bar connecting the sides of the Y-shaped brace and provided with perforated flanges, and a swinging double hook mounted on the standard and adapted to engage the perforated flanges, substantially as described.

In testimony that I claim the foregoing as my own I have hereto affixed my signature in the presence of two witnesses.

DAVID BARTON ENGLISH.

Witnesses:
JOHN M. SMITH,
W. J. BEAVER.